United States Patent Office 3,322,723
Patented May 30, 1967

3,322,723
POLYOXAZOLE/AMIDES
Rudolph J. Angelo, Wilmington, Del., assignor to E. I. du Pont de Nemours and Company, Wilmington, Del., a corporation of Delaware
No Drawing. Filed June 17, 1963, Ser. No. 288,472
3 Claims. (Cl. 260—47)

This invention relates to novel shapeable or tractable polymeric compositions and, more particularly, to the preparation of the tractable polymeric compositions, their formation into shaped articles, and their conversion into substantially intractable polymeric articles. As used in the present specification, "shapeable" refers to the ability of the polymeric compositions to be shaped into useful structures by extrusion through dies, casting as films, coating on substrates, or by similar processing.

The outstanding physical and chemical properties of certain polymers make them extremely useful in the form of shaped structures such as films, filaments, tubing, etc. However, the same outstanding physical and chemical properties make it extremely difficult to shape these polymers into useful structures. One purpose of the present invention is to provide a group of polymeric compositions having satisfactory physical and chemical properties, but which can easily be formed into shaped structures. A further purpose is to select polymeric compositions which, in the form of shaped structures, can be converted into polymers having even more outstanding physical and chemical properties.

Specifically, the object of the present invention is to provide shapeable compositions of certain substituted polyamides. A further object is to provide shaped structures of these polyamide compositions. A still further object of the invention is to convert the polyamide structures to structures of polymers having even more desirable properties than the polyamides, e.g. structures of a poly (benzoxazole/amide). Other objects will appear hereinafter.

The objects are accomplished by a composition containing at least one polyamide having the following structural formula:

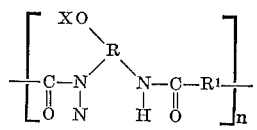

wherein R is an aromatic trivalent radical;
R¹ is arylene;
—X is selected from the group consisting of hydrogen,

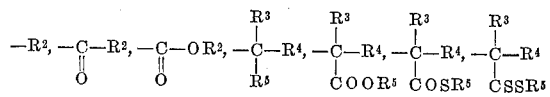

R² being lower alkyl (up to six carbon atoms) and
R³, R⁴ and R⁵, each being selected from the group consisting of hydrogen and R², X being preferably hydrogen and —R²; and wherein
$n$ is an integer sufficient to provide a film-forming polyamide, i.e. having an inherent viscosity of at least 0.1, preferably 0.5–5.0, as measured at 30° C. as a 0.5% solution in a suitable solvent, concentrated sulfuric acid.

The polyamides for use in the composition of the present invention are solids with an undefined melting point. Their infrared absorption spectra are characterized by absorption bands at ca. 3.1 microns due to the N—H bond of the amide groups and at ca. 6.0 microns due to the C=O bond of the amide groups.

The process for preparing the polyamide compositions comprises reacting by mixing at least one organic diamine having the structural formula:

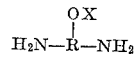

wherein R is an aromatic trivalent radical, each amino group of said diamine attached directly to a carbon atom of a ring of said aromatic radical, one amino group being ortho or peri to the carbon atom to which the —OX is directly attached; with at least one halide-substituted dicarboxylic acid, or an anhydride of the dicarboxylic acid, or lower alkyl esters of the dicarboxylic acid, or phenyl esters of the dicarboxylic acid, preferably the halide-substituted dicarboxylic acid having the structural formula:

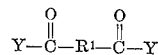

wherein R¹ is arylene; and Y is halogen, preferably chlorine, in an organic solvent for at least one reactant, said solvent being inert to the reactants, for a time, preferably of at least 1 minute, and at a temperature below 175° C., sufficient to provide the corresponding polyamide.

It should be understood that one purpose of the process is to provide a composition that can be shaped into useful objects. In determining a specific time and a specific temperature for forming the polyamide of a specified diamine and a specified substituted acid, several factors must be considered. The maximum permissible temperature will depend on the diamine used, the acid used, the particular solvent, the percentage of polyamide desired in the final composition and the minimum period of time that one desires for the reaction. Temperatures up to 175° C. may be tolerated to provide shapeable compositions of the polyamide. The particular temperature below 175° C. that must not be exceeded for any particular combination of diamine, diacid-halide, solvent and reaction time to provide a reaction product composed of the shapeable polyamide will vary but can be determined by a simple test by any person of ordinary skill in the art.

The resulting polymeric hydroxy or alkoxy amide or the like can be cast or extruded into a film, filament, rod tube or other desired shape, or it can be used in solution as a coating composition. After shaping the composition composed predominantly of the polyamide, preferably still in the solvent, into a useful article, e.g. filament, film, tube, rod, etc., and drying the article, it is preferred to convert the polyamide to another polymer to modify the properties of the shaped structure. Thus, the polyamide is converted to the corresponding poly(benzoxazole/amide) by treatment to split out the elements XOH, i.e. by heating at about 200–350° C., preferably 250°–275° C. for a sufficient time, usually at least one hour, to effect such conversion.

The polybenzoxazole/amides of this invention find many applications in a wide variety of physical shapes and forms. Among the most significant of these forms are films and fibers. Films and fibers of this polymer not only possess excellent physical properties at room temperature, but retain their strength at elevated temperatures for prolonged periods of time. Because of the solubility of the polymer precursors, they can be processed into shaped articles such as films, fibers, tubes, rods, sheets and discs by conventional techniques, and then converted into the final high-melting, relatively intractable cyclized polymers, the polybenzoxazole/amides.

The final shaped article may consist of the heterocyclic polymer alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the intermediate polymer as such or to a solution of the intermediate polymer before shaping. Certain abrasives and electrically conductive materials are better added as surface layers. A cellular form or foam of the final polymer may be produced by adding a conventional blowing agent to the intermediate polymer, either alone or in combination with a filler, followed by heating to decompose the agent and cyclize the polymer units. Alternatively, cellular products can be made by dispersing bubbles (of air, carbon dioxide, nitrogen, etc.) into a melt or solution of the intermediate polymer before shaping and cyclization.

Instead of being shaped itself, the intermediate polymer can be used as a coating composition. Sometimes a melt of this polymer is suitable, but a solution generally is more useful. The liquid coating composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.); polyolefins (polyethylene, polypropylene, polystyrene, etc.), polyesters (polyethylene terephthalate, etc.) polyamides, polyimides, prefluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. Films of the final cyclized polymer can be laminated to any of the above substrates, often with the aid of a commercially available adhesive.

Films formed from the polymer of this invention may be used wherever films have heretofore been used. They serve advantageously in wrapping, packaging and bundling applications. Additionally, the film-forming polymer may be used in automobile and aviation interior head lining materials, decoratve trim, high temperature electrical insulation, in the form of corrosion-resistant pipe, duct work, containers and container linings, and the laminating structures mentioned previously. In fiber form, the polymer of the present invention offers possibilities for high temperature electrical insulation, protective clothing and curtains, filtration media, packing and gusseting materials, brake linings and clutch facings.

In the preparation of the shapeable compositions and the final polymer of the present invention it is essential that the molecular weight be such that the inherent viscosity of the polymers be at least 0.1, preferably 0.5–5.0. The inherent viscosity is measured at 30° C. at a concentration of 0.5% by weight of the polymer in a suitable solvent. The suitable solvent for the purpose of the present invention has been chosen as concentrated sulfuric acid. The viscosity of the polymer solution is measured relative to that of the solvent alone and the inherent viscosity=

$$\text{inherent viscosity} = \frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The starting materials for forming the products of the present invention are at least one compound of the class: aromatic diacid halides, aromatic diacid anhydrides and aromatic diacid lower alkyl or phenyl esters and at least one compound of the class: o-hydroxy arylene diamines, o-lower alkoxy arylene diamines and similar diamines.

The most readily available diamine is 2,4-diaminophenol. Also operable and prepared similarly are other ortho hydroxy amine phenyl compounds and their derivatives of the structure

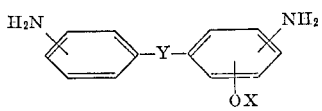

where Y is any one of the following: carbon-carbon bond linking the two aromatic rings; a divalent hydrocarbon radical, i.e., alkylene or alkylidene; a divalent perhalocarbon radical, i.e. perfluoroalkylene or alkylidene; oxygen; sulfur; $SO_2$; CO; CONH; COO;

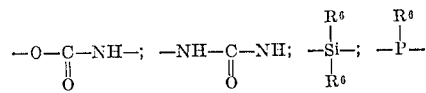

where $R^6$ is hydrogen or lower alkyl.

From the standpoint of availability, the preferred species is that in which Y is a carbon-to-carbon bond. Examples of those having alkylene bridges are the members in which Y is —$CH_2$— and

The linkage is preferably para to either the amino or hydroxy group. Representative operable diamines are:

3-hydroxy-4,4'-diamino biphenyl;
3-methoxy-4,4'-diamino biphenyl;
1,2,-(3-hydroxy-4,4'-diaminodiphenyl)ethane;
2,2-(3-hydroxy-4,4'-diaminodiphenyl) propane;
2,2-(3-hydroxy-4,4'-diaminodiphenyl) hexafluoropropane;
3-hydroxy-4,4'-diaminodiphenyl ether;
3-hydroxy-4,4'-diaminodiphenyl sulfide;
3-hydroxy-4,4'-diaminodiphenyl sulfone;
3-hydroxy-4,4'-diaminodiphenyl ketone;
3-hydroxy-4,4'-diaminodiphenyl methane;
N-(3-hydroxy-4-aminophenyl)-4-aminobenzamide;
(3-hydroxy-4-aminophenyl)-4-aminobenzoate;
(3-hydroxy-4-aminophenyl)-4-aminophenyl carbamate;
N,N'-3-hydroxy-4,4'-diaminodiphenyl urea;
3,3'-diamino-4-hydroxydiphenyl ether;
3,3'-diamino-4-hydroxydiphenyl sulfide;
3,3'-diamino-4-hydroxydiphenyl sulfone;
3,3'-diamino-4-hydroxydiphenyl sulfoxide;
3,3'-diamino-4-hydroxydiphenyl ketone;
3,3'-diamino-4-hydroxydiphenyl methane;
1,2-(3,3'-diamino-4-hydroxydiphenyl)ethane;
2,2-(3,3'-diamino-4-hydroxydiphenyl)propane;
3,3'-diamino-4-hydroxydiphenyl dimethy silane;
3,3'-diamino-4-hydroxydiphenyl dibutyl silane;
3,3'-diamino-4-hydroxydiphenyl methy phosphine;
3,3'-diamino-4-hydroxydiphenyl butyl phosphine;
1,5-diamino-2-naphthol;
1,6-diamino-2-naphthol;
2,5-diamino-1-naphthol;
2,6-diamino-1-naphthol;
1,6-diamino-7-hydroxy naphthalene;
2,5-diamino-6-hydroxy naphthalene;
1,7-diamino-2-hydroxy naphthalene;
2,7-diamino-1-hydroxy naphthalene;
2,7-diamino-3-hydroxynaphthalene;
3,7-diamino-2-hydroxynaphthalene;
1,5-diamino-4-dihydroxynaphthalene;
1,5-diamino-6-hydroxy anthracene;
1,8-diamino-6-hydroxy phenanthrene;
1,4-diamino-2-hydroxy benzene;
1,3-diamino-4-hydroxy benzene;
3-acetoxy-4,4'-diamino biphenyl;

3-thionoacetoxy-4,4'-diamino biphenyl;
methyl carbonate ester of 3-hydroxy-4,4'-diamino biphenyl;
3-(carboxymethyleneoxy)-4,4'-diamino biphenyl;
3-(carbomethoxyethylideneoxy)-4,4'-diamino biphenyl;
3-(carbomethoxyisopropylideneoxy)-4,4'-diamino biphenyl;
3-thiocarbomethoxymethyleneoxy-4,4'-diamino biphenyl;
3-dithio-carbomethoxymethyleneoxy-4,4' diamino biphenyl.

In the latter types of compounds, X is —$CR^3R^4$—$CO_2R^5$, —$CR^3R^4COSR^5$ and —$CR^3R^4CS_2R^5$, respectively, in which $R^3$, $R^4$ and $R^5$ are each hydrogen or lower alkyl. For the sake of simplicity these have been exemplified in the biphenyl series only. The corresponding derivatives of all the other hydroxy compounds shown above are also operable.

Representative members of the class of derivatives of aromatic dicarboxylic acids which are useful in the invention are:

isophthaloyl chloride;
isophthaloyl bromide;
terephthaloyl chloride;
terephthaloyl bromide;
biphenyl-3,3'dicarbonyl chloride;
biphenyl-3,3'-dicarbonyl bromide;
biphenyl-4,4'-dicarbonyl chloride;
biphenyl-4,4'-dicarbonyl bromide;
bis(3-chlorocarbonylphenyl)methane;
bis(4-chlorocarbonylphenyl)methane;
2,2-bis(3-chlorocarbonylphenyl)propane;
2,2-bis(4-chlorocarbonylphenyl)propane;
naphthalene-2,6-dicarbonyl chloride;
bis(3-chlorocarbonylphenyl)ether;
bis(4-chlorocarbonylphenyl)ether;
bis(3-chlorocarbonylphenyl)sulfide;
bis(4-chlorocarbonylphenyl)sulfide;
bis(3-chlorocarbonylphenyl)sulfone; and
bis(4-chlorocarbonylphenylsulfone.

Also operable are the lower alkyl or aryl esters of the foregoing aromatic acids as well as their anhydrides with fatty acids such as acetic acid and alpha-halogenated fatty acids such as trifluoroacetic acid, trichloroacetic acid, difluoroacetic acid and dichloroacetic acid.

As mentioned previously, the reaction of any of these aromatic carboxylic acid derivatives with the hydroxy amines and their derivatives may be carried out in an inert solvent to form the polymeric hydroxy or alkoxy amide or the like. This polymeric intermediate can be shaped and after it is in the desired shape, converted into the corresponding polybenzoxazole by heating at a temperature above about 275° C. This conversion can be started if desired in a high boiling solvent such as diphenylmethane, and then finished by vigorous heating of the dry polymer. The reaction is aided by a current of inert gas such as nitrogen, or by operating in a vacuum, both of which help to remove the by-product water or alcohol. The structural formula of the resulting polybenzoxazole amide follows:

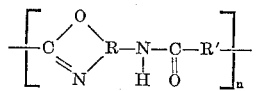

wherein R is an aromatic trivalent radical; each nitrogen atom being attached directly to a carbon atom of a ring of said aromatic radical and one being ortho or peri to the oxygen atom;
$R^1$ is arylene; and
n is an integer sufficiently high to provide a film-forming polymer.

The solvents useful in the solution polymerization process for synthesizing the polyamide compositions of the present invention are the organic solvents whose functional groups do not react with either of the reactants to a greater extent than the reactants do with each other. Besides being inert to the system and, preferably, being a solvent for the product, the organic solvent must be a solvent for at least one of the reactants, preferably for both of the reactants. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethylene urea, pyridine, dimethylsulfone, hexamethylphosphoramide, tetramethylene sulfone, formamide, N-methylformamide and N-acetyl-2-pyrrolidone. The solvents can be used alone, in combinations of solvents, or in combination with poor solvents such as benzene, benzonitrile, dioxane, butyrolactone, xylene, toluene and cyclohexane.

This invention will be more clearly understood by referring to the examples which follow. These examples, which illustrate specific embodiments of the present invention, should not be construed to limit the invention in any way.

*Example 1*

A sample of commercially available 2,4-diaminophenol is purified by clarification and charcoal treatment of a hot water solution of the diamine, followed by precipitation in acetone. The purified diamine is converted to its dihydrochloride, of which 9.85 g. (0.05 mole) is dissolved in 200 ml. of water in a Waring Blendor. Then 200 ml. of tetrahydrofuran (solvent) and 21.21 g. (0.21 mole) of triethylamine (acid acceptor) are added. A solution of 10.15 g. (0.05 mole) of isophthaloyl chloride in 75 ml. of tetrahydrofuran is added rapidly. After vigorous stirring for 5 minutes, the reaction mixture is poured into a large excess of water. The polyamide is separated by filtration, then washed and finally dried under vacuum in a nitrogen atmosphere at 25–45° C. The yield of dark brown powder is 10.43 g. (82.5% of theory). The powder is soluble in sulfuric acid (in which its inherent viscosity is measured as 0.1), but relatively insoluble in N,N-dimethylacetamide and in hexamethylphosphoramide. Its amide structure is confirmed by IR spectra.

Five grams of this powder are placed in a vessel in the shape of a disc and heated 2.5 hours at about 350° C. The resulting product (4.35 g.) is identified by IR spectra as the desired poly(benzoxazole/amide).

*Example 2*

Equimolar amounts of the same diamine and diacid chloride as used in Example 1 are mixed together at ice bath temperature in about 5 parts by weight of hexamethylphosphoramide. The mixture is stirred without cooling for about 70 hours. An aliquot of the product is precipitated in water, washed and dried. The polyamide is obtained in 91% yield. Its inherent viscosity as measured in sulfuric acid is 0.14. The benzoxazole/amide structure of this polymer is confirmed by IR spectra.

Another portion of the above polymer solution in hexamethylphosphoramide is cast into a good film.

*Examples 3–13*

The corresponding poly(benzoxazole/amide) film of good quality is produced by substituting each of the following aromatic diacid chlorides for isophthaloyl chloride in the procedure of Example 2: terephthaloyl chloride; biphenyl-3,3'-dicarbonyl chloride; biphenyl-4,4'-dicarbonyl chloride; bis(3-chlorocarbonylphenyl)methane; 2,2-bis(3-chlorocarbonylphenyl)propane; naphthalene - 2,6 - dicarbonyl chloride; naphthalene-1,8-dicarbonyl chloride; bis(3 - chlorocarbonylphenyl)sulfone; bis(3-chlorocarbonylphenyl)ketone; bis(4-chlorocarbonylphenyl)ketone; and bis(3-chlorocarbonylphenyl)sulfone.

Examples 14–24

A film of good quality composed of the corresponding poly(benzoxazole/amide) results from substituting each of the following hydroxy diamines for the diamine used in the procedure of Example 2: 3,3'-diamino-4-hydroxydiphenyl sulfone; 3,3'-diamino-4-hydroxydiphenyl sulfide; 3,3'-diamino-4-hydroxydiphenyl ether; 3,3'-diamino-4-hydroxydiphenyl methane; 4,4'-diamino-3-hydroxydiphenyl sulfone; 4,4'-diamino-3-hydroxydiphenyl sulfide; 4,4'-diamino-3-hydroxydiphenyl ether; 4,4'-diamino-3-hydroxydiphenyl methane; 1,5'-diamino-2-hydroxynaphthalene; 1,5-diamino-4-hydroxynaphthalene; and 1,4-diamino-5-hydroxynaphthalene.

What is claimed is:

1. A polymer composed of the structural formula

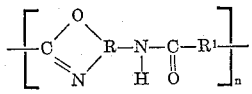

wherein R is an aromatic trivalent radical, each nitrogen atom being attached directly to a carbon atom of a ring of said aromatic trivalent radical and one of said nitrogen atoms being ortho or peri to the oxygen atom, said aromatic trivalent radical being selected from the group consisting of

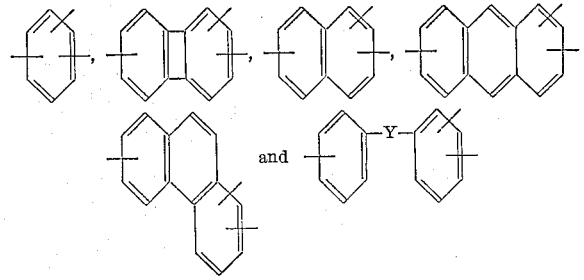

where Y is selected from the group consisting of alkylene, alkylidene, perfluoroalkylene, perfluoroalkylidene, oxygen, sulfur,

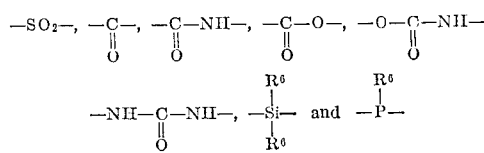

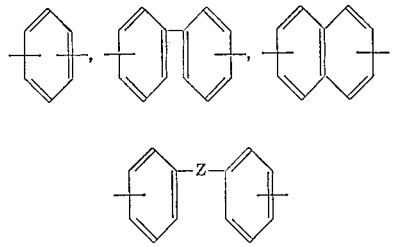

where Z is selected from the group consisting of alkylene of 1–3 carbons, oxygen, —S—, and —SO$_2$; and $n$ is an integer sufficiently high to provide an inherent viscosity of at least 0.1 when measured at 30° C. as an 0.5% by weight solution in concentrated sulfuric acid.

2. The polymer of claim 1 in the form of self-supporting film.

3. The polymer of claim 1 wherein R is the aromatic nucleus in a diamine selected from the group consisting of 2,4-diaminophenol, 3,3'-diamino-4 - hydroxydiphenyl sulfone, 3,3'-diamino-4-hydroxyphenyl sulfide, 3,3'-diamino-4-hydroxydiphenyl ether, 3,3'-diamino-4-hydroxydiphenyl methane, 4,4-diamino-3-hydroxyphenyl sulfone, 4,4' - diamino-3-hydroxydiphenyl sulfide, 4,4'-diamino-3-hydroxydiphenyl ether, 4,4' - diamino-3-hydroxydiphenyl methane, 1,5-diamino - 2 - hydroxynaphthalene, 1,5-diamino-4-hydroxynaphthalene and 1,4-diamino-5-hydroxynaphthalene; R$^1$ is the aromatic nucleus in a diacid chloride selected from the group consisting of isophthaloyl chloride, terephthaloyl chloride, biphenyl-3,3'-dicarbonyl chloride, biphenyl -4,4'-dicarbonyl chloride, bis(3-chlorocarbonylphenyl) methane, 2,2 - bis(3 - chlorocarbonylphenyl) propane, naphthalene-2,6-dicarbonyl chloride, naphthalene-1,8-dicarbonyl chloride, bis(3 - chlorocarbonylphenyl) sulfone, bis(3-chlorocarbonylphenyl) ketone and bis(4-chlorocarbonylphenyl) ketone.

References Cited

UNITED STATES PATENTS 3,094,511    6/1963    Hill et al. _____ 260—78

WILLIAM H. SHORT, *Primary Examiner.*

H. D. ANDERSON, *Assistant Examiner.*